US011659157B2

(12) United States Patent
Chu et al.

(10) Patent No.: US 11,659,157 B2
(45) Date of Patent: May 23, 2023

(54) SYSTEMS FOR MEASURING NAKED-EYE STEREOSCOPIC IMAGE, METHODS AND APPARATUSES FOR PROCESSING IMAGE AND DISPLAY DEVICES

(71) Applicants: Beijing BOE Optoelectronics Technology Co., Ltd., Beijing (CN); BOE Technology Group Co., Ltd., Beijing (CN)

(72) Inventors: Minglei Chu, Beijing (CN); Yan Sun, Beijing (CN); Tiankuo Shi, Beijing (CN); Shuo Zhang, Beijing (CN); Xiaomang Zhang, Beijing (CN); Wei Sun, Beijing (CN); Xin Duan, Beijing (CN); Rui Liu, Beijing (CN); Xue Dong, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/459,747

(22) Filed: Aug. 27, 2021

(65) Prior Publication Data

US 2022/0166965 A1    May 26, 2022

(30) Foreign Application Priority Data

Nov. 25, 2020   (CN) .......................... 202011339787.6

(51) Int. Cl.
*H04N 13/327* (2018.01)
*H04N 13/324* (2018.01)

(52) U.S. Cl.
CPC ......... *H04N 13/327* (2018.05); *H04N 13/324* (2018.05); *H04N 2213/006* (2013.01)

(58) Field of Classification Search
USPC .......................................................... 348/51
See application file for complete search history.

(56) References Cited

U.S. PATENT DOCUMENTS

| 2011/0050727 | A1* | 3/2011 | Mukawa | G09G 5/00 |
|---|---|---|---|---|
| | | | | 345/636 |
| 2016/0198149 | A1* | 7/2016 | Yuuki | H04N 13/376 |
| | | | | 348/56 |

(Continued)

FOREIGN PATENT DOCUMENTS

| CN | 103237227 B | * | 4/2015 | ........... H04N 13/106 |
|---|---|---|---|---|
| CN | 205787618 U | * | 12/2016 | ............... G03H 1/12 |

(Continued)

*Primary Examiner* — Behrooz M Senfi
(74) *Attorney, Agent, or Firm* — Ipro, PLLC

(57) ABSTRACT

The present disclosure relates to a system for measuring a naked-eye stereoscopic image, a method and apparatus for processing an image and a display device. The system includes: a naked-eye stereoscopic display device, configured to display preset images in sequence; an image acquisition device, configured to obtain monochromatic images by capturing display contents of the naked-eye stereoscopic display device, and send the monochromatic images to a processor; and a processor, configured to acquire at least one preset crosstalk amount to each stereoscopic pixel of the naked-eye stereoscopic display device from each view point according to the monochromatic images, where each of the at least one preset crosstalk amount represents a proportion coefficient that measures how much a view from another view point affects a color value of a view from a target view point.

11 Claims, 5 Drawing Sheets

(56) References Cited

U.S. PATENT DOCUMENTS

| | | | |
|---|---|---|---|
| 2017/0017086 A1* | 1/2017 | Wei | G02B 30/27 |
| 2017/0076166 A1* | 3/2017 | Nonogaki | H04N 19/44 |
| 2017/0214900 A1* | 7/2017 | Li | H04N 13/327 |

FOREIGN PATENT DOCUMENTS

| | | | | |
|---|---|---|---|---|
| CN | 109076139 B | * | 12/2020 | G06T 3/0068 |
| EP | 3454553 A1 | * | 3/2019 | G02B 27/22 |

* cited by examiner

SYSTEMS FOR MEASURING NAKED-EYE STEREOSCOPIC IMAGE, METHODS AND APPARATUSES FOR PROCESSING IMAGE AND DISPLAY DEVICES

CROSS REFERENCE TO RELATED APPLICATIONS

This application claims priority to Chinese Patent Application No. 202011339787.6 entitled "SYSTEMS FOR MEASURING NAKED-EYE STEREOSCOPIC IMAGE, METHODS AND APPARATUSES FOR PROCESSING IMAGE AND DISPLAY DEVICES" filed on Nov. 25, 2020, the entire content of which is incorporated herein by reference.

TECHNICAL FIELD

The present disclosure relates to the field of control technologies, and in particular to systems for measuring a naked-eye stereoscopic image, methods and apparatuses for processing an image and display devices.

BACKGROUND

Stereoscopic vision effect can provide human eyes with an image with parallax which is then synthesized by brain to produce a stereoscopic feel. This is widely recognized as one of major mechanisms to form a stereoscopic vision. In an actual application, a stereoscopic television adopts the above mechanism to reproduce an image signal with parallax information (sub-graph) into an image with parallax (view), so as to enable a viewer to have a very vivid stereoscopic feel. Therefore, the mechanism has become a convenient approach to reproduce the stereoscopic vision effect. Taking naked eye watching as an example, the stereoscopic television reproduces a plurality of views so that a relatively natural stereoscopic effect can still be produced when a viewer changes a viewing position.

SUMMARY

To solve the shortcomings of the related art, the present disclosure provides systems for measuring a naked-eye stereoscopic image, methods and apparatuses for processing an image and display devices.

According to a first aspect of embodiments of the present disclosure, provided is a system for measuring a naked-eye stereoscopic image, including an image acquisition device, a naked-eye stereoscopic display device and a processor, the processor being connected with the image acquisition device and the naked-eye stereoscopic display device, respectively. The naked-eye stereoscopic display device is configured to display preset images in sequence, wherein each of the preset images is a monochromatic sub-view in a view from each of m view points, or a part of a monochromatic sub-view in a view from each of the m view points. The image acquisition device is configured to acquire monochromatic images by capturing display contents of the naked-eye stereoscopic display device, and send the monochromatic images to the processor. And the processor is configured to acquire at least one preset crosstalk amount to each stereoscopic pixel of the naked-eye stereoscopic display device from each of the m view points according to the monochromatic images, wherein each of the at least one preset crosstalk amount represents a proportion coefficient that measures how much a view from another view point affects a color value of a view from a target view point.

Optionally, when acquiring the at least one preset crosstalk amount to each stereoscopic pixel of the naked-eye stereoscopic display device from each of the m view points according to the monochromatic images, the processor is configured to: for each stereoscopic pixel in the monochromatic images from each of the m view points, acquire pixel values of the stereoscopic pixel; acquire a color value of the stereoscopic pixel according to the pixel values; acquire a total monochromatic crosstalk amount to the stereoscopic pixel according to color values of the stereoscopic pixel from each of the m view points, so as to acquire the at least one preset crosstalk amount.

Optionally, when acquiring the color value of the stereoscopic pixel according to the pixel values, the processor is configured to: acquire a pixel sum of all the pixel values corresponding to the stereoscopic pixel; determine the color value of the stereoscopic pixel according to the acquired pixel sum based on a preset correspondence between pixel sums and color values.

Optionally, when acquiring the total monochromatic crosstalk amount to the stereoscopic pixel according to the color values of the stereoscopic pixel from each of the m view points, so as to acquire the at least one preset crosstalk amount, the processor is configured to: for each of at least one specified view point, acquire at least one inter-view-point crosstalk amount between the target view point and the specified view point by calculating a ratio of a color value of the specified view point to a color value of the target view point, wherein the at least one specified view point is one or more view points other than the target view point or a preset number of view points adjacent to the target view point; acquire a total crosstalk amount to the target view point by calculating a sum of the at least one inter-view-point crosstalk amount between the target view point and each of the at least one specified view point; for each of the at least one specified view point, acquire at least one preset crosstalk amount to the target view point by calculating a ratio of the inter-view-point crosstalk amount between the target view point and the specified view point to the total crosstalk amount.

Optionally, when acquiring the total monochromatic crosstalk amount to the stereoscopic pixel according to the color values of the stereoscopic pixel from each of the m view points, so as to acquire the at least one preset crosstalk amount, the processor is configured to: acquire at least one inter-view-point crosstalk amount corresponding to the target view point according to the color values of the stereoscopic pixel from each of the in view points; acquire at least one inter-view-point crosstalk amount corresponding to other view points according, to the at least one inter-view-point crosstalk amount corresponding, to the target view point based on a principle that at least one inter-view-point crosstalk amount corresponding to the target view point is identical to at least one inter-view-point crosstalk amount corresponding to the other view points; acquire a total crosstalk amount to the stereoscopic pixel according to the at least one inter-view-point crosstalk amount corresponding to the target view point and the at least one inter-view-point crosstalk amount corresponding to the other view points; acquire at least one preset crosstalk amount by calculating a ratio of each of the at least one inter-view-point crosstalk amount corresponding to the target view point of the stereoscopic pixel to the total crosstalk amount.

Optionally, a capturing position of the image acquisition device is an optimal watching position for a display screen of the naked-eye stereoscopic display device; or, the capturing position of the image acquisition device satisfies the following: an optical axis of the image acquisition device is perpendicular to the display screen of the naked-eye stereoscopic display device with a perpendicular foot being a central position of the display screen, and a field-of-view of the image acquisition device covers the display screen.

Optionally, the processor is further configured to acquire a to-be-displayed initial stereoscopic image and the al least one preset crosstalk amount to each stereoscopic pixel of the naked-eye stereoscopic display device; and further configured to, for each stereoscopic pixel in the initial stereoscopic image, adjust the color value of a view from each of the m view points according to corresponding preset crosstalk amount to acquire a target stereoscopic image; and the naked-eye stereoscopic display device is further configured to display the target stereoscopic image.

According to a second aspect of embodiments of the present disclosure, provided is a method of processing an image, applicable to a naked-eye stereoscopic display device, including: acquiring a to-be-displayed initial stereoscopic image including m view points and acquiring at least one preset crosstalk amount to each stereoscopic pixel from each of the in view points, wherein each of the at least one preset crosstalk amount represents a proportion coefficient that measures how much a view from another view point affects a color value of a view from a target view point; and for each stereoscopic pixel in the initial stereoscopic image, adjusting the color value of a view from each of the in view points according to corresponding preset crosstalk amount to acquire a target stereoscopic image.

Optionally, for each stereoscopic pixel in the initial stereoscopic image, adjusting the color value of the view from each of the m view points according to the corresponding preset crosstalk amount to acquire the target stereoscopic image includes: acquiring a red sub-view, a green sub-view and a blue sub-view in the initial stereoscopic image; adjusting pixel values of the red sub-view, the green sub-view and the blue sub-view corresponding to the stereoscopic pixel according to the at least one preset crosstalk amount to the stereoscopic pixel from each view point in sequence to acquire a target red sub-view, a target green sub-view and a target blue sub-view of the stereoscopic pixel in the target stereoscopic image.

According to a third aspect of embodiments of the present disclosure, provided is an apparatus for processing an image, applicable to a naked-eye stereoscopic display device, including: an initial image acquiring module, configured to acquire a to-be-displayed initial stereoscopic image including in view points; a crosstalk amount acquiring module, configured to acquire at least one preset crosstalk amount to each stereoscopic pixel from each of the m view points, wherein each of the at least one preset crosstalk amount represents a proportion coefficient that measures how much a view from another view point affects a color value of a view from a target view point; and a target image acquiring module, configured to, for each stereoscopic pixel in the initial stereoscopic image, adjust the color value of a view from each of the m view points according to corresponding preset crosstalk amount to acquire a target stereoscopic image.

Optionally, the target image acquiring module includes: a sub-view acquiring unit, configured to acquire a red sub-view, a green sub-view and a blue sub-view corresponding to each stereoscopic pixel in the initial stereoscopic image a sub-view adjusting unit, configured to, for each stereoscopic pixel, adjust pixel values of the red sub-view, the green sub-view and the blue sub-view corresponding to the stereoscopic pixel according to the at least one preset crosstalk amount to the stereoscopic pixel from each view point in sequence to acquire a target red sub-view, a target green sub-view and a target blue sub-view of the stereoscopic pixel in the target stereoscopic image.

According to a fourth aspect of embodiments of the present disclosure, provided is a naked-eye stereoscopic display device, including: a processor; a memory, configured to store computer programs executable by the processor; wherein the processor is configured to execute the computer programs in the memory to: acquire a to-be-displayed initial stereoscopic image including m view points and acquire at least one preset crosstalk amount to each stereoscopic pixel from each of the m view points, wherein each of the at least one preset crosstalk amount represents a proportion coefficient that measures how much a view from another view point affects a color value of a view from a target view point; and for each stereoscopic pixel in the initial stereoscopic image, adjust the color value of a view from each of the m view points according to corresponding preset crosstalk amount to acquire a target stereoscopic image.

Optionally, when for each stereoscopic pixel in the initial stereoscopic image, adjusting the color value of the view from each of the m view points according to the corresponding preset crosstalk amount to acquire the target stereoscopic image, the processor is configured to: acquire a red sub-view, a green sub-view and a blue sub-view corresponding to each stereoscopic pixel in the initial stereoscopic image; for each stereoscopic pixel, adjust pixel values of the red sub-view, the green sub-view and the blue sub-view corresponding to the stereoscopic pixel according to the at least one preset crosstalk amount to the stereoscopic pixel from each view point in sequence to acquire a target red sub-view, a target green sub-view and a target blue sub-view of the stereoscopic pixel in the target stereoscopic image.

According to a fifth aspect of embodiments of the present disclosure, provided is a non-transitory computer readable storage medium, storing executable computer programs, wherein the executable computer program in the storage medium is executed by a processor to implement the above methods.

It should be understood that the above general descriptions and subsequent detailed descriptions are merely illustrative and explanatory and shall not be intended to limit the present disclosure.

BRIEF DESCRIPTION OF DRAWINGS

The accompanying drawings, which are incorporated in and constitute a part of the present description, illustrate embodiments consistent with the present disclosure and serve to explain the principles of the present disclosure together with the specification.

DETAILED DESCRIPTION

Figure 1:
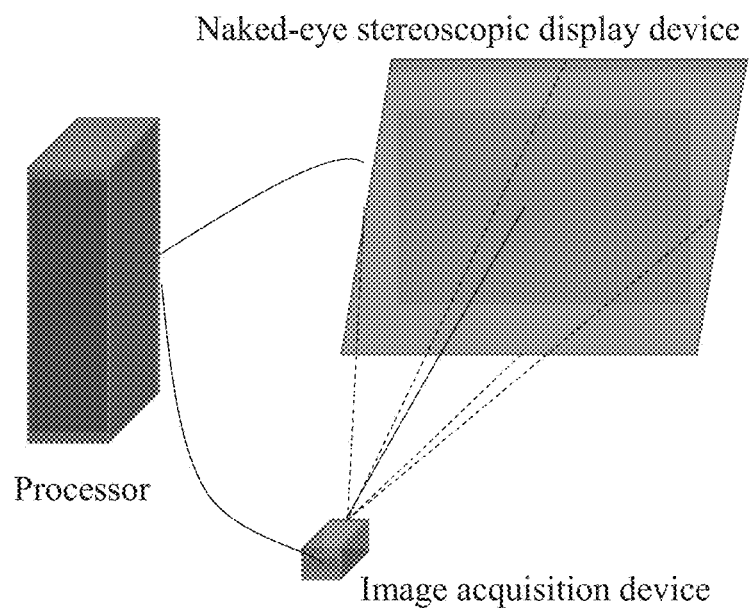
FIG. 1 is an architecture diagram of a system for measuring a naked-eye stereoscopic image according to an embodiment of the present disclosure.

Embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Theoretically, there is only one view that can be seen when watching a stereoscopic television with naked eyes. However, there exists a phenomenon that information of a plurality of other sub-graphs is included in one view besides information of corresponding sub-graphs, bringing about crosstalk to naked-eye stereoscopic display. Therefore, stereoscopic vision effect and watching comfort will be severely affected.

An embodiment of the present disclosure provides a system for measuring a naked-eye stereoscopic image. FIG. 1 is an architecture diagram of a system for measuring a naked-eye stereoscopic image according to an embodiment of the present disclosure. As shown in FIG. 1, the system for measuring a naked-eye stereoscopic image includes an image acquisition device, a naked-eye stereoscopic display device and a processor. The processor is connected with the image acquisition device and the naked-eye stereoscopic display device in a wired or wireless manner respectively.

The naked-eye stereoscopic display device is configured to display preset images in sequence, where each of the preset images is a monochromatic sub-view in a view from one view point of m view points, or a part of a monochromatic sub-view in a view from one view point of the m view points. The naked-eye stereoscopic display device is further configured to display images with parallax after completing crosstalk optimization. The naked-eye stereoscopic display device includes a display screen.

The image acquisition device is configured to acquire monochromatic images by capturing display contents of the naked-eye stereoscopic display device and send the monochromatic images to the processor.

The processor is configured to acquire at least one preset crosstalk amount to each stereoscopic pixel of the naked-eye stereoscopic display device from each of the m view points according to the monochromatic images. Each of the at least one preset crosstalk amount represents a proportion coefficient that quantifies how much a view of/from another view point affects a color value of a view from a target view point.

It is noted that the preset crosstalk amount to each stereoscopic pixel from each view point may include a red crosstalk amount, a green crosstalk amount and a blue crosstalk amount. Considering the same manner of obtaining the crosstalk amounts of different colors, a crosstalk amount of one color will be taken as an example in the following embodiments, and the crosstalk amounts of different colors will no longer be distinguished in various embodiments.

Figure 2:
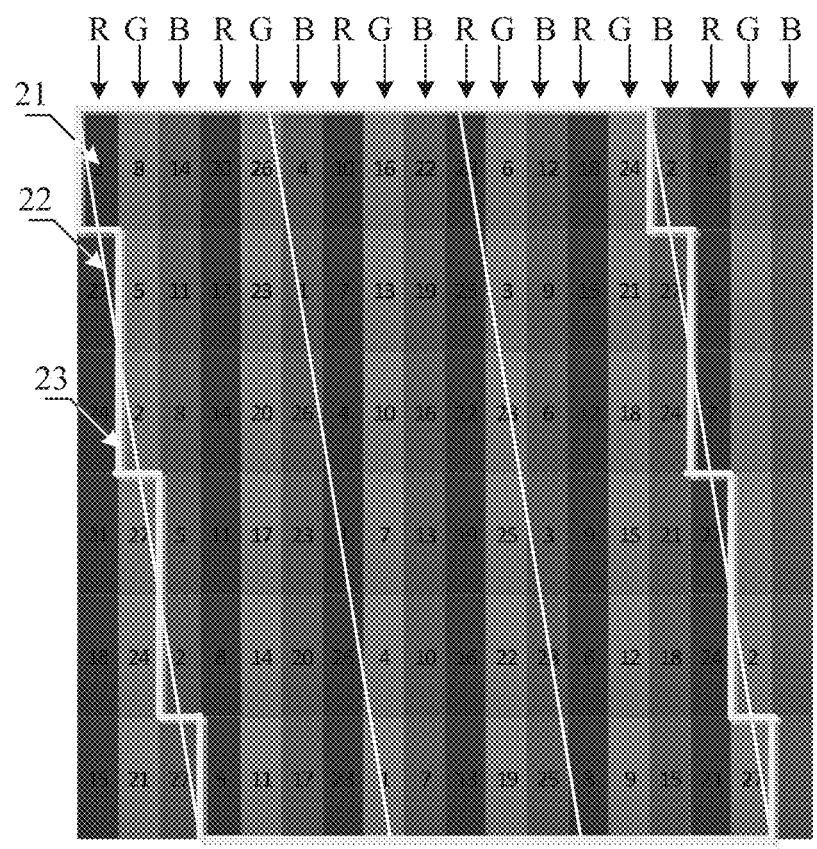
FIG. 2 is a schematic diagram of a stereoscopic pixel according to an embodiment of the present disclosure.

In this embodiment, the naked-eye stereoscopic display device may include a plurality of stereoscopic pixels, which can display views of/from m view points. Therefore, a user may see from each view point of m view points one frame of stereoscopic image different from stereoscopic images from other view points. FIG. 2 is a schematic diagram of arrangement of a stereoscopic pixel according to an embodiment of the present disclosure. With reference to FIG. 2, the stereoscopic pixel is a stereoscopic pixel of 28 view points, i.e. a region surrounded by bent lines 23. A straight line 22 represents a boundary of a lenticular lens grating or a slit grating. The numeral 21 refers to a sub-pixel corresponding to each view point. For example, when the numeral 21 points to a red sub-pixel shown by 2, it means a red sub-pixel of the view point 2 in the present stereoscopic pixel. That is, the stereoscopic pixel in FIG. 2 includes 28*3 sub-pixels. Each stereoscopic pixel in the naked-eye stereoscopic display device is arranged periodically according to an arrangement rule of the stereoscopic pixel shown in FIG. 2.

Figure 3:
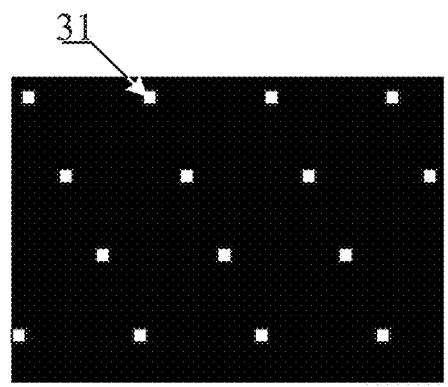
FIG. 3 is an effect diagram of displaying a monochromatic image by a display screen according to an embodiment of the present disclosure.

In this embodiment, the processor may control the display screen to display a monochromatic image of only one color of red, green or blue. Taking view point 14 as an example, FIG. 3 shows a diagram in which only sub-pixels of the view point 14 display a green view, where a sub-pixel 31 in FIG. 3 represents a green sub-pixel G. In this case, after the monochromatic image of the view point 14 is acquired, the monochromatic images of the view points 1-13 and the view points 15-28 may be acquired, respectively.

It is understood that view points having a larger crosstalk on a view point are usually a preset number of adjacent view points (referred to as crosstalk view point). In some scenarios, the monochromatic images of the target view point and at least one specified view point (e.g. three adjacent view points) may be acquired. With the view point 14 as an example, the monochromatic image of the view point 14 may be acquired, and then the monochromatic images of its level-1 crosstalk view points 13 and 15, level-2 crosstalk view points 12 and 16, and level-3 crosstalk view points 11 and 17 may be acquired. In an embodiment, a two-view-point stereoscopic display screen may adopt the monochromatic images of the level-1 crosstalk view points, and a multi-view-point stereoscopic display screen may adopt the monochromatic images of the level-1 and level-2 crosstalk view points.

Because the adjacent stereoscopic pixels in the display screen are close to each other, two adjacent stereoscopic pixels may not be distinguished in the monochromatic image. In an embodiment, the processor may control every few stereoscopic pixels in the display screen to display, where the number of the stereoscopic pixels between two adjacent stereoscopic pixels that display under the control of the processor may be set according to specific scenario. That is, the monochromatic image may refer to an image taken when a part of a monochromatic sub-view in a view from one view point is displayed.

Figure 4A:
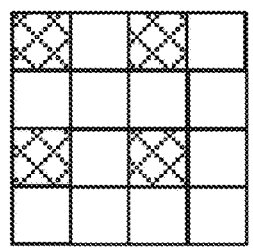
FIGS. 4A to 4D are effect diagrams of displaying a monochromatic image with spaced stereoscopic pixels according to an embodiment of the present disclosure.
Figure 4B:
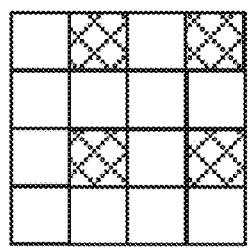
Figure 4C:
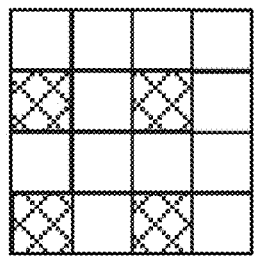
Figure 4D:
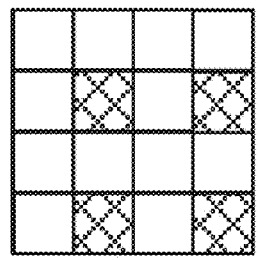

Taking controlling every other stereoscopic pixel to display as an example, firstly, the stereoscopic pixels at odd-numbered rows and odd-numbered columns are controlled to display, as shown in FIG. 4A; secondly, the stereoscopic pixels at odd-numbered rows and even-numbered columns are controlled to display, as shown in FIG. 4B; thirdly, the stereoscopic pixels at even-numbered rows and odd-numbered columns are controlled to display, as shown in FIG. 4C; fourthly, the stereoscopic pixels at even-numbered rows and even-numbered columns are controlled to display, as shown in FIG. 4D. Thus, in the embodiment, pixel values of all stereoscopic pixels may be acquired by capturing four times. The at least one preset crosstalk amount to each stereoscopic pixel may be acquired by performing the method of processing an image according to the present disclosure four times.

In this embodiment, the image acquisition device may include an electronic device having an image acquisition function such as a camera. The subsequent embodiments will be described with the image acquisition device being a camera as an example. In this embodiment, the monochromatic images may be acquired by a camera, where a resolution of the camera needs to be 1920*1080 or higher. The higher the resolution is, the better the capturing effect is. An optimized capturing effect can be achieved when a focal length of the camera is identical to or approximate to an optimal watching distance of the display screen of the naked-eye stereoscopic display device. Further, the field-of-view (FOV) of the camera needs to be such that the camera can capture the entire display screen or the display contents.

Before acquiring a monochromatic image, the camera may be placed at a preset position for capturing. In an embodiment, the capturing position of the camera may be the optimal watching position for the display screen of the naked-eye stereoscopic display device. In another embodiment, an optical axis of the camera is perpendicular to the display screen with a perpendicular foot being a central position of the display screen, and the capturing position of the camera may be as shown in FIG. 5.

Figure 5:
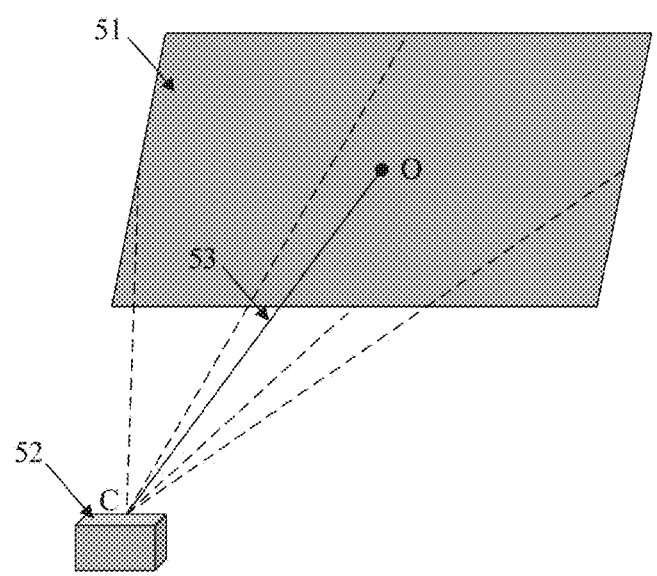
FIG. 5 is an application scenario diagram of a capturing position of a camera according to an embodiment of the present disclosure.

As shown in FIG. 5, an optical axis 53 of a camera 52 is perpendicular to a display screen 51 of the naked-eye stereoscopic display device with a perpendicular foot O being a central position O of the display screen 51, and a distance CO between the display screen 51 and the camera 52 is the optimal watching distance of the display screen.

After the camera is placed at the optimal preset position, distortion correction may be performed on the camera to reduce distortion of a captured image, where the correction method may include but is not limited to Zhang Zhengyou Method. The specific correction method may be selected according to specific scenario and will not be repeated herein.

Furthermore, after the camera is placed at the optimal preset position, brightness correction may be performed on the camera to reduce a camera-induced error of brightness of a captured image, where the correction method may include but is not limited to a non-uniform illumination compensation method. The specific correction method may be selected according to specific scenario and will not be repeated herein.

In this embodiment, the processor may acquire a color value of a stereoscopic pixel according to pixel values of the stereoscopic pixel in a monochromatic image. For example, for each stereoscopic pixel in the monochromatic image from a view point, the processor may acquire a pixel sum of all pixel values corresponding to the stereoscopic pixel, and then determine the color value of the stereoscopic pixel according to the acquired pixel sum based on a preset correspondence between pixel sums and color values.

Figure 6:
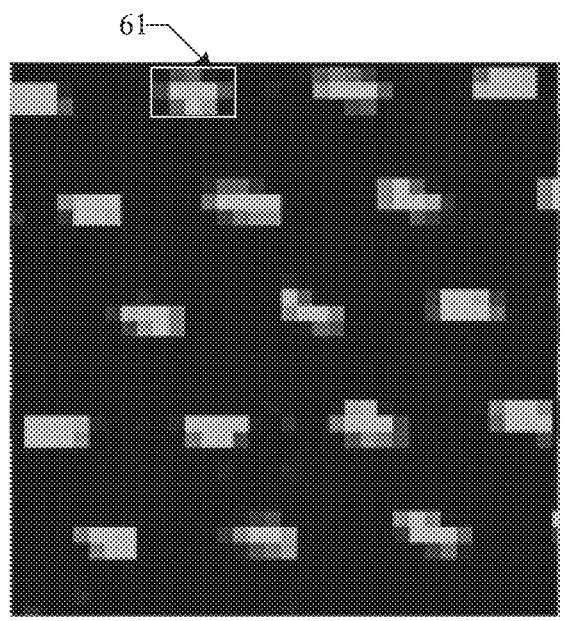
FIG. 6 is a schematic diagram of a monochromatic image taken by a camera according to an embodiment of the present disclosure.

As shown in FIG. 6, with a particular stereoscopic pixel 61 (3 rows and 5 columns) as an example, the processor may acquire the pixel values of the stereoscopic pixel 61 as shown in Table 1.

| Pixel values of the stereoscopic pixel 61. | | | | |
|---|---|---|---|---|
| 0 | C1 | C2 | C3 | 0 |
| C4 | C5 | C6 | C7 | C8 |
| 0 | C9 | C10 | C11 | 0 |

Based on the pixel values of the stereoscopic pixel 61 shown in Table 1, a sum of the pixel values of the stereoscopic pixel 61, i.e. the pixel sum of the stereoscopic pixel 61, may be obtained using the formula: $V\_total=C1+C2+\ldots+C10+C11$. Then, the processor may acquire the color value $V14=F(V\_total)$ of the stereoscopic pixel 61 from the current view point (e.g. the view point 14), where F represents a preset correspondence between pixel sums and color values. In an embodiment, F representing the preset correspondence between pixel sums and color values may be valued as 1, i.e. $V14=V\_total$.

Based on the above manner, the processor may acquire the color value of each stereoscopic pixel from the current view point according to the monochromatic image: $V\_14\_i$, $i=1, 2, 3, \ldots, N$, where N is a number of stereoscopic pixels.

In this embodiment, for each stereoscopic pixel, the processor may acquire a total monochromatic crosstalk amount to the stereoscopic pixel according to color values of the stereoscopic pixel from each of the m view points, so as to acquire the at least one preset crosstalk amount.

In an embodiment, for each of at least one specified view point, the processor may acquire an inter-view-point crosstalk amount between the target view point and the specified view point by calculating a ratio of a color value of the specified view point to a color value of the target view point. The at least one specified view point is one or more view points other than the target view point, or a preset number of view points (i.e. crosstalk view points) adjacent to the target view point. For example, when the camera exactly faces the display screen, the view point corresponding to the camera is the target view point. With the target view point being the view point 14 as an example, the pixel sum (green component value) of the stereoscopic pixels from the target view point is $G\_V\_k\_i$, where $k=14$, $i=1, 2, 3, \ldots, N$, and N is a number of stereoscopic pixels.

In an embodiment, the processor may further acquire the pixel sum (green component value) of the stereoscopic pixel from each of the at least one specified view point. With the at least one specified view point being level-K crosstalk view points as an example, the green component value of the stereoscopic pixel from each of the level-K crosstalk view points is $G\_V\_m\_i$, where m is a serial number of the view point, $m=1, 2, 3, \ldots, 2*K$, $i=1, 2, 3, \ldots, N$, and N is a number of stereoscopic pixels.

In this case, the inter-view-point crosstalk amount is $R\_G\_m\_k\_i=G\_V\_m\_i/G\_V\_k\_i$, where $m=1, 2, 3, \ldots, 2*K$, in is a serial number of view point, $i=1, 2, 3, \ldots, N$, and N is a number of stereoscopic pixels.

Similarly, the processor may further acquire the inter-view-point crosstalk amounts $R\_R\_m\_k\_i$ and $R\_B\_m\_k\_i$ to the target view point when the display screen displays a monochromatic image of other color components (R, B), which will not be repeated herein.

Next, the processor may acquire a total crosstalk amount to the target view point by calculating a sum of the inter-view-point crosstalk amounts between the target view point and each of the at least one specified view point. Continuing taking the target view point being the view point 14 as an example, the crosstalk amounts of the level-K crosstalk view points of different colors to a stereoscopic pixel i are R_G_m_k_i, R_R_m_k_i and R_B_m_k_i, and the total crosstalk amount to the stereoscopic pixel from the target view point is as follows:

$$R\_G\_Total\_i = \sum_{m=1}^{2 \times K} R\_G\_m\_k\_i + K;$$

$$R\_R\_Total\_i = \sum_{m=1}^{2 \times K} R\_R\_m\_k\_i + K;$$

$$R\_B\_Total\_i = \sum_{m=1}^{2 \times K} R\_B\_m\_k\_i + K;$$

Afterwards, the processor may acquire the preset crosstalk amount to the target view point by calculating a ratio of the inter-view-point crosstalk amount to the target view point to the total crosstalk amount, for example, R_G_1_k_i/R_G_Total_i.

In another embodiment, the processor may acquire at least one inter-view-point crosstalk amount corresponding to the target view point according to the color values, which can be referred to steps of the above-mentioned embodiments and will not be repeated herein. The naked-eye stereoscopic display device may pre-store a principle that at least one inter-view-point crosstalk amount corresponding to the target view point is identical to at least one inter-view-point crosstalk amount corresponding to other view points. And the processor may acquire at least one inter-view-point crosstalk amount corresponding to the other view points according to the at least one inter-view-point crosstalk amount corresponding to the target view point based on the principle. That is, the at least one inter-view-point crosstalk amount to the other view points may be acquired after the at least one inter-view-point crosstalk amount to the target view point is acquired. The processor may acquire the total crosstalk amount to each stereoscopic pixel according to inter-view-point crosstalk amounts between the target view point and other view points, which can be referred to the above-mentioned embodiments and will not be repeated herein. The processor may acquire at least one preset crosstalk amount by calculating a ratio of each of the at least one inter-view-point crosstalk amount corresponding to the target view point of each stereoscopic pixel to the total crosstalk amount, which can be referred to the above-mentioned embodiments and will not be repeated herein. In this embodiment, the inter-view-point crosstalk amounts of all view points can be acquired by acquiring the inter-view-point crosstalk amounts of the target view point, which helps to reduce data processing amount and improve processing efficiency.

A plurality of naked-eye stereoscopic display devices of same specifications such as size, resolution, and stereoscopic pixel density may be produced in batches in a production process. After the naked-eye stereoscopic display device in FIG. 1 acquires the at least one preset crosstalk amount, the at least one preset crosstalk amount may be copied and stored in other naked-eye stereoscopic display devices in the same batch as the naked-eye stereoscopic display device in FIG. 1. In this way, when displaying a stereoscopic image, the naked-eye stereoscopic display device in FIG. 1 and other naked-eye stereoscopic display devices in the same batch may adjust an initial stereoscopic image based on the at least one preset crosstalk amount. For each stereoscopic pixel in the initial stereoscopic image, the processor may acquire a target stereoscopic image by adjusting the color value of a view from each view point according to corresponding preset crosstalk amount. For example, the processor may acquire a red sub-view, a green sub-view and a blue sub-view corresponding to each stereoscopic pixel in the initial stereoscopic image. The processor may acquire a target red sub-view, a target green sub-view and a target blue sub-view of each stereoscopic pixel in the target stereoscopic image by adjusting the pixel values of the red sub-view, the green sub-view and the blue sub-view corresponding to each stereoscopic pixel according to the at least one preset crosstalk amount to each stereoscopic pixel from each view point. Therefore, in this embodiment, the inter-view-point crosstalk can be eliminated and the accuracy of displaying the target stereoscopic image can be improved, such that the displayed target stereoscopic image is consistent with the stereoscopic image seen by a user, thereby improving watching experiences.

It is assumed that a RGB value of the i-th stereoscopic pixel of the target view point k is (R_k_i, G_k_i, B_k_i), the corrected RGB value of the stereoscopic pixel is (C_R_k_i, C_G_k_i, C_B_k_i), and the RGB value of the i-th stereoscopic pixel from the corresponding level-K crosstalk view point is (R_m_k_i, G_m_k_i, B_m_k_i). In this case, $$C\_R\_k\_i = R\_1\_k\_i*(R\_R\_1\_k\_i/R\_R\_Total\_i) + R\_2\_k\_i*(R\_R\_2\_k\_i/R\_R\_Total\_i) + \ldots + R\_2*K\_k\_i*(R\_R\_2*K\_k\_i/R\_R\_Total\_i) + R\_k\_i*(K/R\_R\_Total\_i);$$

$$C\_G\_k\_i = G\_1\_k\_i*(R\_G\_1\_k\_i/R\_G\_Total\_i) + G\_2\_k\_i*(R\_G\_2\_k\_i/R\_G\_Total\_i) + \ldots + G\_2*K\_k\_i*(R\_G\_2*K\_k\_i/R\_G\_Total\_i) + G\_k\_i*(K/R\_G\_Total\_i);$$

$$C\_B\_k\_i = B\_1\_k\_i*(R\_B\_1\_k\_i/R\_B\_Total\_i) + B\_2\_k\_i*(R\_B\_2\_k\_i/R\_B\_Total\_i) + \ldots + B\_2*K\_k\_i*(R\_B\_2*K\_k\_i/R\_B\_Total\_i) + B\_k\_i*(K/R\_B\_Total\_i).$$

Continuing taking the target view point being the view point 14 as an example, k=14, and the level of crosstalk view points K=2, the RGB value of the i-th stereoscopic pixel currently is (R_14_i, G_14_i, B_14_i), the corrected RGB value of the stereoscopic pixel is (C_R_14_i, C_G_14_i, C_B_14_i), and the pixel values of the stereoscopic pixel from the corresponding level-2 crosstalk view point are (R_1_14_i, G_1_14_i, B_1_14_i), (R_2_14_i, G_2_14_i, B_2_14_i), (R_3_14_i, G_3_14_i, B_3_14_i) and (R_4_14_i, G_4_14_i, B_4_14_i), respectively. In this case, $$C\_R\_14\_i = R\_1\_14\_i*(R\_R\_1\_14\_i/R\_R\_Total\_i) + R\_2\_14\_i*(R\_R\_2\_14\_i/R\_R\_Total\_i) + R\_3\_14\_i*(R\_R\_3\_14\_i/R\_R\_Total\_i) + R\_4\_14\_i*(R\_R\_4\_14\_i/R\_R\_Total\_i) + R\_14\_i* (2/R\_R\_Total\_i);$$

$$C\_G\_14\_i = G\_1\_14\_i*(R\_G\_1\_14\_i/R\_G\_Total\_i) + G\_2\_14\_i*(R\_G\_2\_14\_i/R\_G\_Total\_i) + G\_3\_14\_i*(R\_G\_3\_14\_i/R\_G\_Total\_i) + G\_4\_14\_i*(R\_G\_4\_14\_i/R\_G\_Total\_i) + G\_14\_i* (2/R\_G\_Total\_i);$$

$$C\_B\_14\_i = B\_1\_14\_i*(R\_B\_1\_14\_i/R\_B\_Total\_i) + B\_2\_14\_i*(R\_B\_2\_14\_i/R\_B\_Total\_i) + B\_3\_14\_i*(R\_B\_3\_14\_i/R\_B\_Total\_i) + B\_4\_14\_i*(R\_B\_4\_14\_i/R\_B\_Total\_i) + B\_14\_i* (2/R\_B\_Total\_i).$$

Figure 7A:
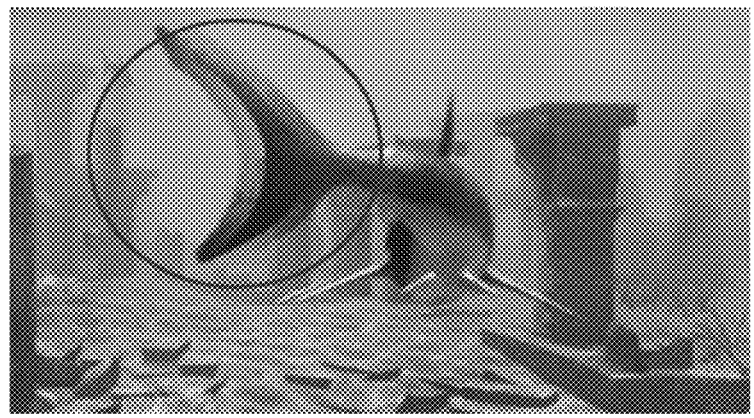
FIG. 7A is a schematic diagram of an initial stereoscopic image according to an embodiment of the present disclosure.
Figure 7B:
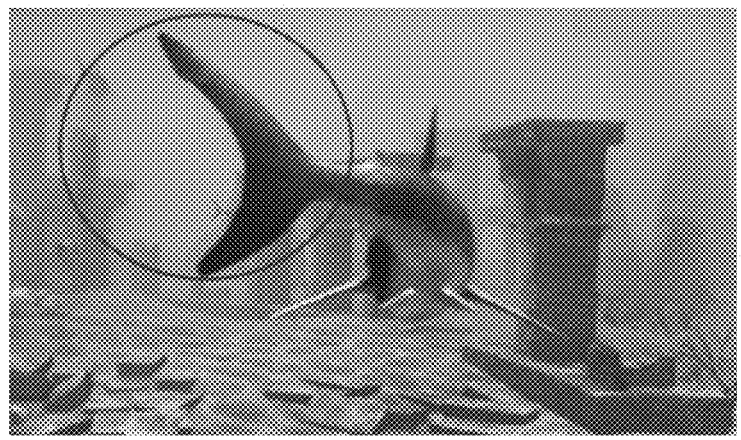
FIG. 7B is a schematic diagram of a target stereoscopic image according to an embodiment of the present disclosure.

Similarly, the processor may process the stereoscopic pixels from other view points based on the above method so as to acquire the target stereoscopic image. With reference to FIGS. 7A and 7B, FIG. 7A shows an initial stereoscopic image in which the tail of the shark has a shadow; FIG. 7B shows a target stereoscopic image in which the tail of the shark has no shadow. That is, the inter-view-point crosstalk can be eliminated in this embodiment.

Finally, the processor may assign the target stereoscopic image to corresponding stereoscopic pixels to allow the display screen to display the above target stereoscopic image.

In the system for measuring a naked-eye stereoscopic image according to the embodiments of the present disclosure, the naked-eye stereoscopic display device may display preset images in sequence, where each of the preset images refers to a monochromatic sub-view in a view from each view point of m view points, or a part of a monochromatic sub-view in a view from each view point. The image acquisition device may acquire monochromatic images by capturing display contents of the naked-eye stereoscopic display device and send the monochromatic images to the processor. The processor is configured to acquire the at least one preset crosstalk amount to each stereoscopic pixel of the naked-eye stereoscopic display device from each view point according to the monochromatic images. Each of the at least one preset crosstalk amount is used to represent a proportion coefficient that measures how much a view from another view point affects a color value of a view from a target view point. In this way, the inter-view-point crosstalk can be eliminated by performing crosstalk compensation for subsequently-displayed stereoscopic images by using the preset crosstalk amount in this embodiment, such that the user can see a view from merely one view point as possible at the view point, thereby improving the watching experiences of the user.

The solution of the method of processing an image will be described below by referring to FIGS. 1, 8 and 9 in combination with specific embodiments.

1. Distortion correction on camera

Firstly, the system for measuring a naked-eye stereoscopic image shown in FIG. 1 is corrected. Firstly, distortion correction is performed on the camera by Zhang Zhengyou method to reduce distortion of a captured image.

2. Brightness correction on camera

Brightness correction is performed on the camera by the non-uniform illumination compensation method to reduce a camera-induced error of a brightness of a captured image.

3. Camera position determination+image acquisition from current view point+image acquisition from crosstalk view point 1) For each stereoscopic pixel in the display screen of the naked-eye stereoscopic display device, one sub-pixel from one view point therein may be selected to display, for example, the green sub-pixel from the view point 14 as shown in FIG. 3.

2) Placement of camera

As shown in FIG. 5, the central position of the display screen 51 of the naked-eye stereoscopic display device is point O, and the lens optical axis of the camera 52 is CO. CO is perpendicular to the display screen 51 and intersects at the point O, and the length of CO is the optimal watching distance of the display screen.

3) The camera is controlled to capture the display screen and the image is shown in FIG. 6. As shown in FIG. 6, each sub-pixel is one display region in the monochromatic image taken by the camera, and the display regions are not mutually connected and can be distinctly distinguished.

If the display regions are mutually connected, every other stereoscopic pixel or every few stereoscopic pixels can be controlled to display, and the monochromatic image can be acquired through capturing for several times with the capturing manner shown in FIGS. 4A-4D. In some embodiments, the images acquired through capturing for several times can be fused to obtain the monochromatic image.

4) For each stereoscopic pixel, all pixel values on the monochromatic image are calculated, for example, the sum of the pixel values of the stereoscopic pixel 61 in FIG. 6 is V_total=C1+C2+ . . . +C10+C11. The color value of a particular stereoscopic pixel from the view point 14 is V14=F(V_total) and in some embodiments, V14=V_total.

Similarly, the color value $V\_14\_i$ of each stereoscopic pixel is acquired, where i=1, 2, 3, . . . , N, and N is a number of stereoscopic pixels.

5) Image acquisition under crosstalk view point

Figure 9:
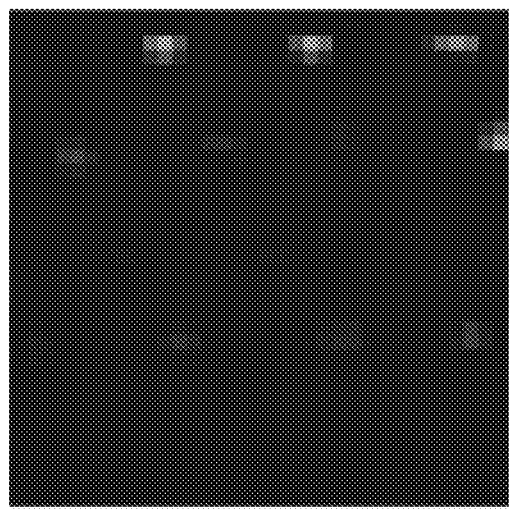
FIG. 9 is an effect diagram of a monochromatic image of a crosstalk view point according to an embodiment of the present disclosure.

Under same conditions, the positions of the camera and the display screen are made stationary, and images of level-1 through K crosstalk view points are acquired as shown in FIG. 9. The level-K crosstalk refers to a crosstalk of a view point spaced K from the current view point to the current view point, for example, the current view point is view point 14, and the level-1 crosstalk is a crosstalk of the view point 13 or 15 to the view point 14, and the level-2 crosstalk is a crosstalk of the view point 12 or 16 to the view point 14. It is understood that a total of 2K images are acquired for up to K levels of crosstalk. For example, the current view point is view point 14, and K=2, and thus $V\_1\_i$ represents a color value of a stereoscopic pixel from the view point 12, $V\_2\_i$ represents a color value of a stereoscopic pixel from the view point 13, $V\_3\_i$ represents a color value of a stereoscopic pixel from the view point 15, and $V\_4\_i$ represents a color value of a stereoscopic pixel from the view point 16. Generally, for a two-view-point display screen, K=1, and for a multi-view-point display screen, K=2.

Figure 8:
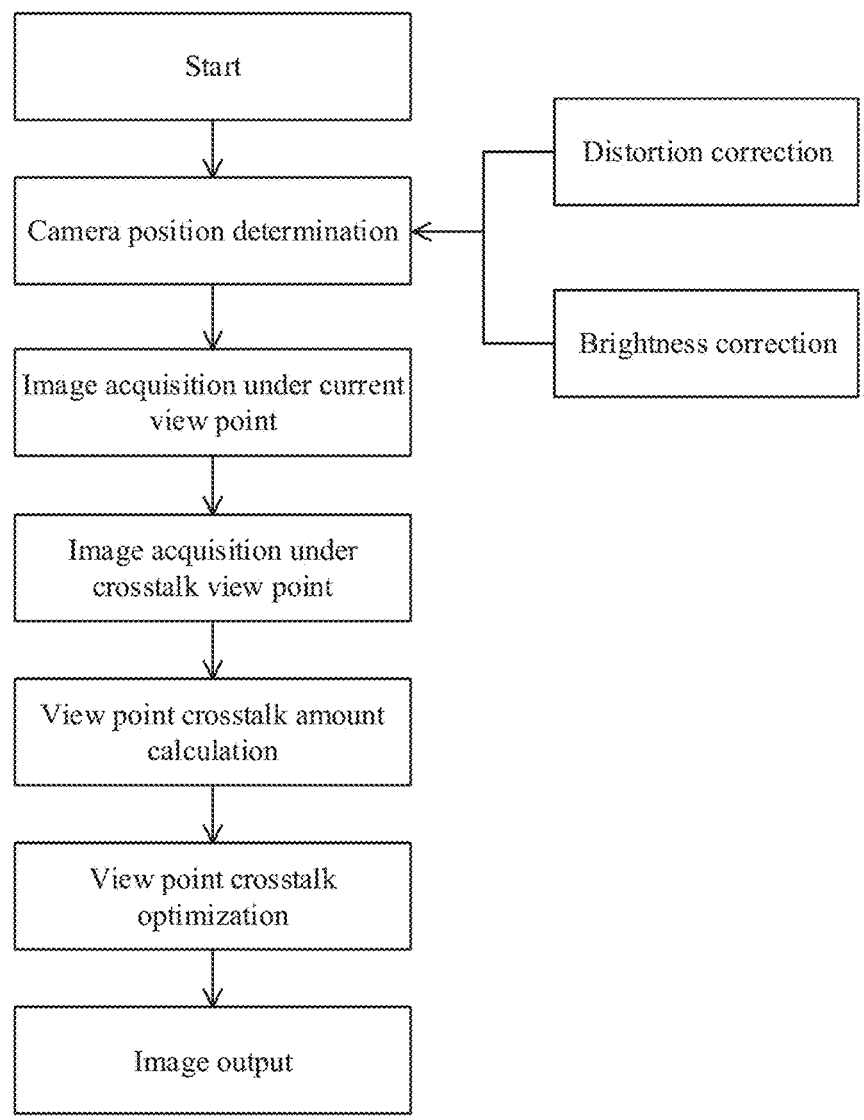
FIG. 8 is a flowchart of a method of processing an image according to an embodiment of the present disclosure.

With reference to FIG. 8, images of the green sub-pixels of the level 1 to level-K crosstalk view points are collected, and the color values $V\_m\_i$ of the corresponding stereoscopic pixel are acquired by the method shown in the above step 4), where m is a serial number of view point.

4. View point crosstalk amount calculation

As known from step 3, the green component value of the stereoscopic pixel of the test view point, that is, the view point 14 of the display screen to which a camera exactly faces, is $G\_V\_k\_i$, where k=14.

At the same time, the green component values $G\_V\_m\_i$ of the stereoscopic pixel from level-1 to level-K crosstalk view points may also be acquired.

In this case, the inter-view-point crosstalk amount is $R\_G\_m\_k\_i = G\_V\_m\_i / G\_V\_k\_i$.

Similarly, the inter-view-point crosstalk amounts $R\_R\_m\_k\_i$, $R\_B\_m\_k\_i$ of over color components (R, B) may also be measured.

In an example, each view point may be taken as the test view point through the above step 3, and crosstalk test may be performed on other view points, and then an accurate view point crosstalk amount to each view point may be acquired by the calculation method in step 4.

In another example, only one view point is tested and the crosstalk amounts of other view points are assumed to be identical to the at least one crosstalk amount to the view point, and thus the test value of the view point is equivalently applied to those of other view points.

5. Crosstalk optimization

For the current view point k (k=14), the crosstalk amounts of the level-K view point of different colors for each stereoscopic pixel i are R_G_m_k_i, R_R_m_k_i and R_B_m_k_i.

The total crosstalk amount to the current stereoscopic pixel is:

$$R\_G\_Total\_i = \Sigma_{m=1}^{2 \times K} R\_G\_m\_k\_i + K;$$

$$R\_R\_Total\_i = \Sigma_{m=1}^{2 \times K} R\_R\_m\_k\_i + K;$$

$$R\_B\_Total\_i = \Sigma_{m=1}^{2 \times K} R\_B\_m\_k\_i + K;$$

It is assumed that the RGB value of the i-th stereoscopic pixel of the current view point k is (R_k_i, G_k_i, B_k_i), the corrected RGB value of the stereoscopic pixel is (C_R_k_i, C_G_k_i, C_B_k_i), the RGB value of the i-th stereoscopic pixel of the corresponding level-K crosstalk view point is (R_m_k_i, G_m_k_i, B_m_k_i), where m=1, 2, . . . , 2*K. In this case, $$C\_R\_k\_i = R\_1\_k\_i*(R\_R\_1\_k\_i/R\_R\_Total\_i) + \\ R\_2\_k\_i*(R\_R\_2\_k\_i/R\_R\_Total\_i) + \ldots \\ + R\_2*K\_k\_i*(R\_R\_2*K\_k\_i/R\_R\_Total\_i) + \\ R\_k\_i*(K/R\_R\_Total\_i);$$

$$C\_G\_k\_i = G\_1\_k\_i*(R\_G\_1\_k\_i/R\_G\_Total\_i) + \\ G\_2\_k\_i*(R\_G\_2\_k\_i/R\_G\_Total\_i) + \ldots + \\ G\_2*K\_k\_i*(R\_G\_2*K\_k\_i/R\_G\_Total\_i) + \\ G\_k\_i*(K/R\_G\_Total\_i);$$

$$C\_B\_k\_i = B\_1\_k\_i*(R\_B\_1\_k\_i/R\_B\_Total\_i) + \\ B\_2\_k\_i*(R\_B\_2\_k\_i/R\_B\_Total\_i) + \ldots + \\ B\_2*K\_k\_i*(R\_B\_2*K\_k\_i/R\_B\_Total\_i) + \\ B\_k\_i*(K/R\_B\_Total\_i).$$

Continuing taking the target view point being the view point 14 as an example, k=14, the level of crosstalk view points K=2, the RGB value of the i-th stereoscopic pixel currently is (R_14_i, G_14_i, B_14_i), the corrected RUB value of the stereoscopic pixel is (C_R_14_i, C_G_14_i, C_B_14_i), the pixel values of the stereoscopic pixel of the corresponding level-2 crosstalk view points are (R_1_14_i, G_1_14_i, B_1_14_i), (R_2_14_i, G_2_14_i, B_2_14_i), (R_3_14_i, G_3_14_i, B_3_14_i), and (R_4_14_i, G_4_14_i, B_4_14_i). In this case.

$$C\_R\_14\_i = R\_1\_14\_i*(R\_R\_1\_14\_i/R\_R\_Total\_i) + \\ R\_2\_14\_i*(R\_R\_2\_14\_i/R\_R\_Total\_i) + \\ R\_3\_14\_i*(R\_R\_3\_14\_i/R\_R\_Total\_i) + \\ R\_4\_14\_i*(R\_R\_4\_14\_i/R\_R\_Total\_i) + R\_14\_i* \\ (2/R\_R\_Total\_i);$$

$$C\_G\_14\_i = G\_1\_14\_i*(R\_G\_1\_14\_i/R\_G\_Total\_i) + \\ G\_2\_14\_i*(R\_G\_2\_14\_i/R\_G\_Total\_i) + \\ G\_3\_14\_i*(R\_G\_3\_14\_i/R\_G\_Total\_i) + \\ G\_4\_14\_i*(R\_G\_4\_14\_i/R\_G\_Total\_i) + G\_14\_i* \\ (2/R\_G\_Total\_i);$$

$$C\_B\_14\_i = B\_1\_14\_i*(R\_B\_1\_14\_i/R\_B\_Total\_i) + \\ B\_2\_14\_i*(R\_B\_2\_14\_i/R\_B\_Total\_i) + \\ B\_3\_14\_i*(R\_B\_3\_14\_i/R\_B\_Total\_i) + \\ B\_4\_14\_i*(R\_B\_4\_14\_i/R\_B\_Total\_i) + B\_14\_i* \\ (2/R\_B\_Total\_i).$$

Other view points may be processed by the same method and the optimized color values are assigned to the current stereoscopic pixel, so as to complete the optimization process.

Figure 10:
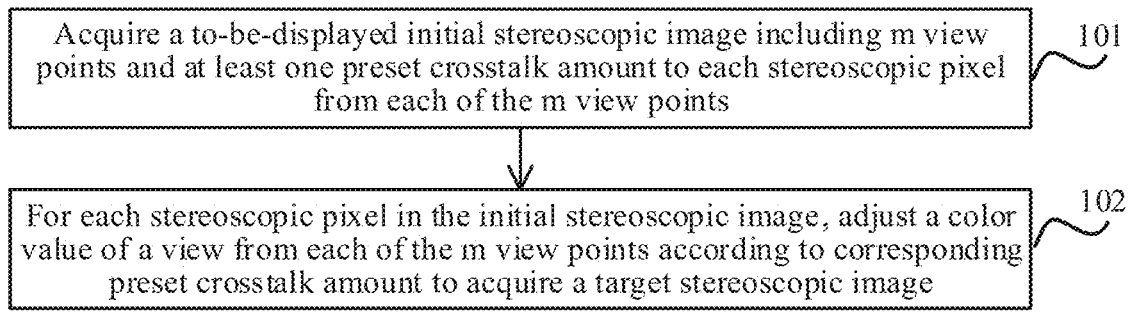
FIG. 10 is a flowchart of a method of processing an image according to an embodiment of the present disclosure.

On the basis of the above system for measuring a naked-eye stereoscopic image, an embodiment of the present disclosure further provides a method of processing an image. FIG. 10 is a flowchart of a method of processing an image according to an embodiment of the present disclosure, where the method is applicable to a naked-eye stereoscopic display device. The naked-eye stereoscopic display device may include a plurality of stereoscopic pixels which may display the views of m view points. In this case, a user may see one frame of stereoscopic image different from stereoscopic images from other view points from each view point of the m view points.

FIG. 10 shows a method of processing an image, including steps 101 and 102. In step 101, a to-be-displayed initial stereoscopic image including m view points and at least one preset crosstalk amount to each stereoscopic pixel from each of the in view points are acquired, where each of the at least one preset crosstalk amount is used to represent a proportion coefficient that measures how much a view from another view point affects a color value of a view from a target view point.

In an embodiment, in a display process, a processor in the naked-eye stereoscopic display device may acquire to-be-displayed initial stereoscopic images including m view points in sequence, that is, the initial stereoscopic images include views from m view points.

In this embodiment, the naked-eye stereoscopic display device may pre-store at least one preset crosstalk amount to each stereoscopic pixel from each view point, where each of the at least one preset crosstalk amount is used to represent a proportion coefficient that measure how much a view from another view point affects a color value of a view from a target view point. It is understood that because each stereoscopic pixel is subjected to different degrees of influences from other stereoscopic pixels when displaying sub-views of different colors, the at least one preset crosstalk amount to each stereoscopic pixel includes a green crosstalk amount, a red crosstalk amount and a blue crosstalk amount.

In step 102, for each stereoscopic pixel in the initial stereoscopic image, a color value of a view from each of the in view points is adjusted according to corresponding preset crosstalk amount to acquire a target stereoscopic image.

Figure 11:
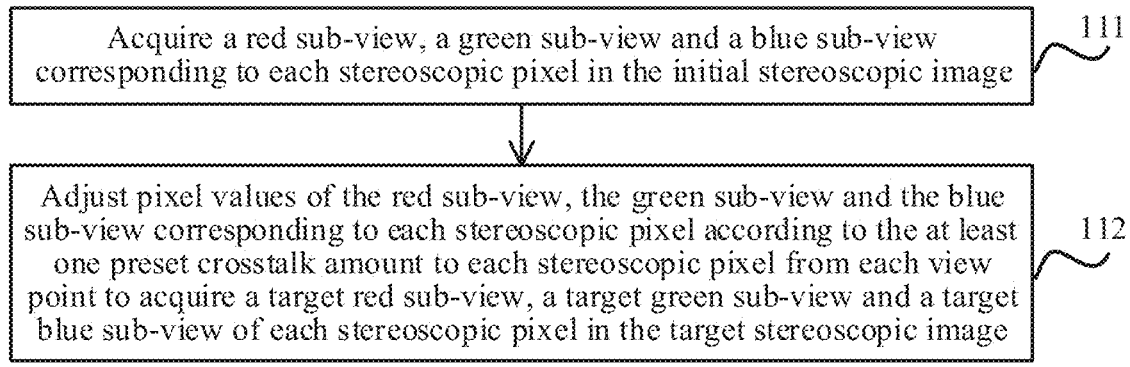
FIG. 11 is a flowchart of obtaining a target stereoscopic image according to an embodiment of the present disclosure.

In this embodiment, for each stereoscopic pixel in the initial stereoscopic image, the processor may adjust the color value of the view from each view point according to the corresponding preset crosstalk amount to acquire the target stereoscopic image. As shown in FIG. 11, in step 111, the processor may acquire a red sub-view, a green sub-view and a blue sub-view corresponding to each stereoscopic pixel in the initial stereoscopic image. In step 112, the processor may adjust pixel values of the red sub-view, the green sub-view and the blue sub-view corresponding to each stereoscopic pixel according to the at least one preset crosstalk amount to each stereoscopic pixel from each view point to acquire a target red sub-view, a target green sub-view and a target blue sub-view of each stereoscopic pixel in the target stereoscopic image.

It is assumed that the RGB value of the i-th stereoscopic pixel from the target view point k is (R_k_i, G_k_i, B_k_i), the corrected RGB value of the stereoscopic pixel is (C_R_k_i, C_G_k_i, C_B_k_i), the RGB value of the i-th stereoscopic pixel from the corresponding level-K crosstalk view point is (R_m_k_i, G_m_k_i, B_m_k_i). In this case, $$C\_R\_k\_i = R\_1\_k\_i*(R\_R\_1\_k\_i/R\_R\_Total\_i) + \\ R\_2\_k\_i*(R\_R\_2\_k\_i/R\_R\_Total\_i) + \ldots + \\ R\_2*K\_k\_i*(R\_R\_2*K\_k\_i/R\_R\_Total\_i) + \\ R\_k\_i*(K/R\_R\_Total\_i);$$

$$C\_G\_k\_i = G\_1\_k\_i*(R\_G\_1\_k\_i/R\_G\_Total\_i) + \\ G\_2\_k\_i*(R\_G\_2\_k\_i/R\_G\_Total\_i) + \ldots + \\ G\_2*K\_k\_i*(R\_G\_2*K\_k\_i/R\_G\_Total\_i) + \\ G\_k\_i*(K/R\_G\_Total\_i);$$

$$C\_B\_k\_i = B\_1\_k\_i*(R\_B\_1\_k\_i/R\_B\_\text{Total}\_i) +$$
$$B\_2\_k\_i*(R\_B\_2\_k\_i/R\_B\_\text{Total}\_i) + \ldots +$$
$$B\_2*K\_k\_i*(R\_B\_2*K\_k\_i/R\_B\_\text{Total}\_i) +$$
$$B\_k\_i*(K/R\_B\_\text{Total}\_i).$$

Continuing taking the target view point being the view point 14 as an example, k=14, the level of crosstalk view points K=2, the RGB value of the i-th stereoscopic pixel currently is (R_14_i, G_14_i, B_14_i), the corrected RGB value of the stereoscopic pixel is (C_R_14_i, C_G_14_i, C_B_14_i), the pixel values of the stereoscopic pixel from the corresponding level-2 crosstalk view, points are (R_1_14_i, G_1_14_i, B_1_14_i), (R_2_14_i, G_2_14_i, B_2_14_i), (R_3_14_i, G_3_14_i, B_3_14_i) and (R_4_14_i, G_4_14_i, B_4_14_i), respectively. In this case, $$C\_R\_14\_i = R\_1\_14\_i*(R\_R\_1\_14\_i/R\_R\_\text{Total}\_i) +$$
$$R\_2\_14\_i*(R\_R\_2\_14\_i/R\_R\_\text{Total}\_i) +$$
$$R\_3\_14\_i*(R\_R\_3\_14\_i/R\_R\_\text{Total}\_i) +$$
$$R\_4\_14\_i*(R\_R\_4\_14\_i/R\_R\_\text{Total}\_i) + R\_14\_i*$$
$$(2/R\_R\_\text{Total}\_i);$$

$$C\_G\_14\_i = G\_1\_14\_i*(R\_G\_1\_14\_i/R\_G\_\text{Total}\_i) +$$
$$G\_2\_14\_i*(R\_G\_2\_14\_i/R\_G\_\text{Total}\_i) +$$
$$G\_3\_14\_i*(R\_G\_3\_14\_i/R\_G\_\text{Total}\_i) +$$
$$G\_4\_14\_i*(R\_G\_4\_14\_i/R\_G\_\text{Total}\_i) + G\_14\_i*$$
$$(2/R\_G\_\text{Total}\_i);$$

$$C\_B\_14\_i = B\_1\_14\_i*(R\_B\_1\_14\_i/R\_B\_\text{Total}\_i) +$$
$$B\_2\_14\_i*(R\_B\_2\_14\_i/R\_B\_\text{Total}\_i) +$$
$$B\_3\_14\_i*(R\_B\_3\_14\_i/R\_B\_\text{Total}\_i) +$$
$$B\_4\_14\_i*(R\_B\_4\_14\_i/R\_B\_\text{Total}\_i) + B\_14\_i*$$
$$(2/R\_B\_\text{Total}\_i).$$

Similarly, the processor may process the stereoscopic pixels from other view points based on the above method so as to acquire the target stereoscopic image. With reference to FIGS. 7A and 7B, FIG. 7A shows an initial stereoscopic image in which the tail of the shark has a shadow; FIG. 71-3 shows a target stereoscopic image in which the tail of the shark has no shadow. That is, the inter-view-point crosstalk can be eliminated in this embodiment.

Finally, the processor may assign the target stereoscopic image to corresponding stereoscopic pixels to allow the display screen to display the above target stereoscopic image.

In the embodiments of the present disclosure, a to-be-displayed initial stereoscopic image including m view points and at least one preset crosstalk amount to each stereoscopic pixel from each of the in view points may be acquired. And then, for each stereoscopic pixel in the initial stereoscopic image, the color value of a view from each of the in view points according to corresponding preset crosstalk amount to acquire a target stereoscopic image. In this way, the inter-view-point crosstalk can be eliminated by performing compensation for crosstalk amount in this embodiment, such that the user can see a view from one view point as possible at the view point, helping to improve the watching experiences of the user.

Figure 12:
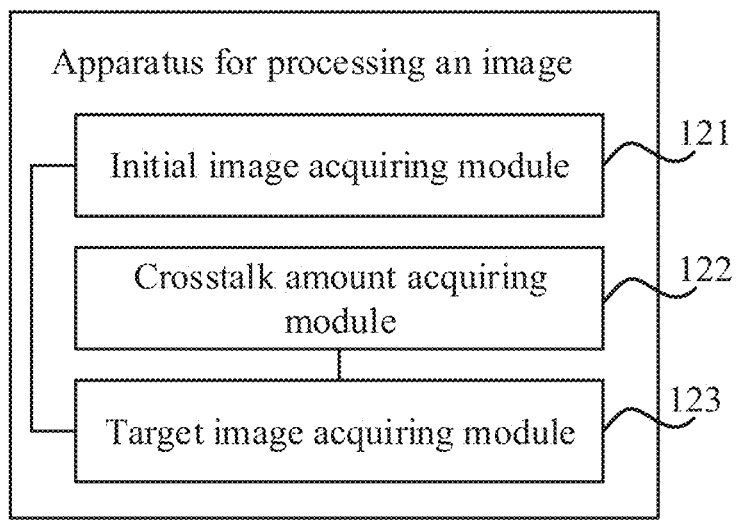
FIG. 12 is a block diagram of an apparatus for processing an image according to an embodiment of the present disclosure.

An embodiment of the present disclosure provides an apparatus for processing an image, applicable to a naked-eye stereoscopic display device. FIG. 12 is a block diagram of an apparatus for processing an image according to an embodiment of the present disclosure. As shown in FIG. 12, the apparatus includes: an initial image acquiring module 121, configured to acquire a to-be-displayed initial stereoscopic image including m view points; a crosstalk amount acquiring module 122, configured to acquire at least one preset crosstalk amount to each stereoscopic pixel from each of the in view points, where each of the at least one preset crosstalk amount represents a proportion coefficient that measures how much a view from another view point affects a color value of a view from a target view point; a target image acquiring module 123, configured to, for each stereoscopic pixel in the initial stereoscopic image, adjust the color value of a view from each of the m view points according to corresponding preset crosstalk amount to acquire a target stereoscopic image.

In an embodiment, the target image acquiring module includes: a sub-view acquiring unit, configured to acquire a red sub-view, a green sub-view and a blue sub-view corresponding to each stereoscopic pixel in the initial stereoscopic image; a sub-view adjusting unit, configured to, for each stereoscopic pixel, adjust pixel values of the red sub-view, the green sub-view and the blue sub-view corresponding to the stereoscopic pixel according to the at least one preset crosstalk amount to the stereoscopic pixel from each view point in sequence to acquire a target red sub-view, a target green sub-view and a target blue sub-view of the stereoscopic pixel in the target stereoscopic image.

It is understood that the apparatus according to the embodiments of the present disclosure corresponds to the above method, and reference may be made to the above method embodiments for specific contents. Therefore, redundant descriptions will not be made herein.

In an illustrative embodiment, there is further provided a naked-eye stereoscopic display device, including: a processor; a memory configured to store computer programs executable by the processor. The processor is configured to execute the computer programs in the memory to implement the steps of the above method.

In an illustrative embodiment, there is further provided a non-transitory readable storage medium including executable computer programs, for example, a memory including instructions. The executable computer programs may be executed by a processor to implement the steps of the above method. The readable storage medium may be read only memory (ROM), random access memory (RAM), CD-ROM, magnetic tape, floppy disk, and optical data storage device and the like.

Other implementations of the present disclosure will be apparent to those skilled in the art from consideration of the specification and practice of the present disclosure herein. The present disclosure is intended to cover any variations, uses or adaptive modification that follow the general principles of the present disclosure and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A system for measuring a naked-eye stereoscopic image, comprising an image acquisition device, a naked-eye stereoscopic display device and a processor, the processor being connected with the image acquisition device and the naked-eye stereoscopic display device, respectively;

the naked-eye stereoscopic display device is configured to display preset images in sequence, wherein each of the preset images is a monochromatic sub-view in a view from each of m view points, or a part of a monochromatic sub-view in a view from each of the m view points;

the image acquisition device is configured to acquire monochromatic images by capturing display contents of the naked-eye stereoscopic display device, and send the monochromatic images to the processor; and the processor is configured to acquire at least one preset crosstalk amount to each stereoscopic pixel of the naked-eye stereoscopic display device from each of the m view points according to the monochromatic images, wherein each of the at least one preset crosstalk amount represents a proportion coefficient that measures how much a view from another view point affects a color value of a view from a target view point;

wherein when acquiring the at least one preset crosstalk amount to each stereoscopic pixel of the naked-eye stereoscopic display device from each of the m view points according to the monochromatic images, the processor is configured to:

for each stereoscopic pixel in the monochromatic images from each of the m view points,
acquire pixel values of the stereoscopic pixel;
acquire a color value of the stereoscopic pixel according to the pixel values;
acquire a total monochromatic crosstalk amount to the stereoscopic pixel according to color values of the stereoscopic pixel from each of the m view points, so as to acquire the at least one preset crosstalk amount.

2. The system according to claim 1, wherein when acquiring the color value of the stereoscopic pixel according to the pixel values, the processor is configured to:
acquire a pixel sum of all the pixel values corresponding to the stereoscopic pixel;
determine the color value of the stereoscopic pixel according to the acquired pixel sum based on a preset correspondence between pixel sums and color values.

3. The system according to claim 1, wherein when acquiring the total monochromatic crosstalk amount to the stereoscopic pixel according to the color values of the stereoscopic pixel from each of the m view points, so as to acquire the at least one preset crosstalk amount, the processor is configured to:
for each of at least one specified view point, acquire at least one inter-view-point crosstalk amount between the target view point and the specified view point by calculating a ratio of a color value of the specified view point to a color value of the target view point, wherein the at least one specified view point is one or more view points other than the target view point or a preset number of view points adjacent to the target view point;
acquire a total crosstalk amount to the target view point by calculating a sum of the at least one inter-view-point crosstalk amount between the target view point and each of the at least one specified view point;
for each of the at least one specified view point, acquire at least one preset crosstalk amount to the target view point by calculating a ratio of the inter-view-point crosstalk amount between the target view point and the specified view point to the total crosstalk amount.

4. The system according to claim 1, wherein when acquiring the total monochromatic crosstalk amount to the stereoscopic pixel according to the color values of the stereoscopic pixel from each of the m view points, so as to acquire the at least one preset crosstalk amount, the processor is configured to:
acquire at least one inter-view-point crosstalk amount corresponding to the target view point according to the color values of the stereoscopic pixel from each of the m view points;
acquire at least one inter-view-point crosstalk amount corresponding to other view points according to the at least one inter-view-point crosstalk amount corresponding to the target view point based on a principle that at least one inter-view-point crosstalk amount corresponding to the target view point is identical to at least one inter-view-point crosstalk amount corresponding to the other view points;
acquire a total crosstalk amount to the stereoscopic pixel according to the at least one inter-view-point crosstalk amount corresponding to the target view point and the at least one inter-view-point crosstalk amount corresponding to the other view points;
acquire at least one preset crosstalk amount by calculating a ratio of each of the at least one inter-view-point crosstalk amount corresponding to the target view point of the stereoscopic pixel to the total crosstalk amount.

5. The system according to claim 1, wherein,
a capturing position of the image acquisition device is an optimal watching position for a display screen of the naked-eye stereoscopic display device; or,
the capturing position of the image acquisition device satisfies the following: an optical axis of the image acquisition device is perpendicular to the display screen of the naked-eye stereoscopic display device with a perpendicular foot being a central position of the display screen, and a field-of-view of the image acquisition device covers the display screen.

6. The system according to claim 1, wherein the processor is further configured to acquire a to-be-displayed initial stereoscopic image and the at least one preset crosstalk amount to each stereoscopic pixel of the naked-eye stereoscopic display device; and further configured to, for each stereoscopic pixel in the initial stereoscopic image, adjust the color value of a view from each of the m view points according to corresponding preset crosstalk amount to acquire a target stereoscopic image; and
the naked-eye stereoscopic display device is further configured to display the target stereoscopic image.

7. A method of processing an image, applicable to a naked-eye stereoscopic display device, comprising:
acquiring a to-be-displayed initial stereoscopic image comprising m view points and acquiring at least one preset crosstalk amount to each stereoscopic pixel from each of the m view points, wherein each of the at least one preset crosstalk amount represents a proportion coefficient that measures how much a view from another view point affects a color value of a view from a target view point; and
for each stereoscopic pixel in the initial stereoscopic image, adjusting the color value of a view from each of the m view points according to corresponding preset crosstalk amount to acquire a target stereoscopic image;
wherein the at least one preset crosstalk amount is pre-stored in the naked-eye stereoscopic display device and calculated in a following manner:
acquiring monochromatic images by capturing preset images sequentially displayed by the naked-eye stereoscopic display device, wherein each of the preset images is a monochromatic sub-view in a view from each of the m view points, or a part of a monochromatic sub-view in a view from each of the m view points;
for each stereoscopic pixel in the monochromatic images from each of the m view points,
acquiring pixel values of the stereoscopic pixel;

acquiring a color value of the stereoscopic pixel according to the pixel values;

acquiring a total monochromatic crosstalk amount to the stereoscopic pixel according to color values of the stereoscopic pixel from each of the m view points, so as to acquire the at least one preset crosstalk amount.

8. The method according to claim 7, wherein for each stereoscopic pixel in the initial stereoscopic image, adjusting the color value of the view from each of the m view points according to the corresponding preset crosstalk amount to acquire the target stereoscopic image comprises:

acquiring a red sub-view, a green sub-view and a blue sub-view in the initial stereoscopic image;

adjusting pixel values of the red sub-view, the green sub-view and the blue sub-view corresponding to the stereoscopic pixel according to the at least one preset crosstalk amount to the stereoscopic pixel from each view point in sequence to acquire a target red sub-view, a target green sub-view and a target blue sub-view of the stereoscopic pixel in the target stereoscopic image.

9. A naked-eye stereoscopic display device, comprising:
a processor;
a memory, configured to store computer programs executable by the processor;
wherein the processor is configured to execute the computer programs in the memory to:

acquire a to-be-displayed initial stereoscopic image comprising m view points and acquire at least one preset crosstalk amount to each stereoscopic pixel from each of the m view points, wherein each of the at least one preset crosstalk amount represents a proportion coefficient that measures how much a view from another view point affects a color value of a view from a target view point; and for each stereoscopic pixel in the initial stereoscopic image, adjust the color value of a view from each of the m view points according to corresponding preset crosstalk amount to acquire a target stereoscopic image;

wherein the at least one preset crosstalk amount is pre-stored in the naked-eye stereoscopic display device and calculated in a following manner:

acquiring monochromatic images by capturing preset images sequentially displayed by the naked-eye stereoscopic display device, wherein each of the preset images is a monochromatic sub-view in a view from each of the m view points, or a part of a monochromatic sub-view in a view from each of the m view points;

for each stereoscopic pixel in the monochromatic images from each of the m view points,
acquiring pixel values of the stereoscopic pixel;
acquiring a color value of the stereoscopic pixel according to the pixel values;

acquiring a total monochromatic crosstalk amount to the stereoscopic pixel according to color values of the stereoscopic pixel from each of the m view points, so as to acquire the at least one preset crosstalk amount.

10. The naked-eye stereoscopic display device according to claim 9, wherein when for each stereoscopic pixel in the initial stereoscopic image, adjusting the color value of the view from each of the m view points according to the corresponding preset crosstalk amount to acquire the target stereoscopic image, the processor is configured to:

acquire a red sub-view, a green sub-view and a blue sub-view in the initial stereoscopic image;

adjust pixel values of the red sub-view, the green sub-view and the blue sub-view corresponding to the stereoscopic pixel according to the at least one preset crosstalk amount to the stereoscopic pixel from each view point in sequence to acquire a target red sub-view, a target green sub-view and a target blue sub-view of the stereoscopic pixel in the target stereoscopic image.

11. A non-transitory computer readable storage medium, storing executable computer programs, wherein the executable computer program in the storage medium is executed by a processor to implement the method according to claim 7.

* * * * *